(12) United States Patent
Matsuda

(10) Patent No.: US 7,518,626 B2
(45) Date of Patent: Apr. 14, 2009

(54) LIGHT BEAM SYNCHRONIZATION DETECTOR AND PRINTER

(75) Inventor: Hideo Matsuda, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 820 days.

(21) Appl. No.: 10/963,812

(22) Filed: Oct. 14, 2004

(65) Prior Publication Data

US 2005/0083397 A1 Apr. 21, 2005

(30) Foreign Application Priority Data

Oct. 16, 2003 (JP) .............. P2003-356436

(51) Int. Cl.
*B41J 2/435* (2006.01)
(52) U.S. Cl. .................... 347/236; 347/246
(58) Field of Classification Search ............. 347/229, 347/236–237, 246–247; 250/214 C, 236
See application file for complete search history.

(56) References Cited

U.S. PATENT DOCUMENTS

| 4,386,272 A | * | 5/1983 | Check et al. | ............... 250/236 |
| 5,382,917 A |   | 1/1995 | Miyake et al. | |
| 5,410,145 A | * | 4/1995 | Coroy | .................. 250/214 C |
| 5,754,214 A | * | 5/1998 | Okino | ...................... 347/229 |

FOREIGN PATENT DOCUMENTS

| JP | 57-73566 A | 5/1982 |
| JP | 4-247761 A | 9/1992 |
| JP | 05-167792 A | 7/1993 |
| JP | 6-148542 A | 5/1994 |
| JP | 6-169227 A | 6/1994 |
| JP | 6-441163 U | 6/1994 |
| JP | 10-329359 A | 12/1998 |
| JP | 2001-296489 A | 10/2001 |
| JP | 2002-131662 A | 5/2002 |

* cited by examiner

*Primary Examiner*—Hai C Pham
(74) *Attorney, Agent, or Firm*—Birch, Stewart, Kolasch & Birch, LLP

(57) ABSTRACT

In this light beam synchronization detector, an enable circuit 34 outputs a first control signal Se1 to an output circuit 35 when at least one of the absolute values of a voltage signal V1 from a first amplifier 31 and a voltage signal V2 from a second amplifier 32 exceeds the absolute value of a threshold voltage −Vth, thereby putting the output circuit 35 into an operative state. The enable circuit 34 outputs a second control signal Se2 to the output circuit 35 when both the absolute values of the first output voltage V1 and the second output voltage V2 are equal to or lower than the absolute value of the threshold voltage −Vth, thereby putting the output circuit 35 into an inoperative state. This light beam synchronization detector can prevent the occurrence of an error in the detection timing of a light beam due to a change in the quantity of light of the light beam and preventing the occurrence of erroneous detection due to reflected light.

11 Claims, 8 Drawing Sheets

LIGHT BEAM SYNCHRONIZATION DETECTOR AND PRINTER

This Nonprovisional application claims priority under 35 U.S.C. §119(a) on Patent Application No. P2003-356436 filed in Japan on Oct. 16, 2003, the entire contents of which are hereby incorporated by reference.

BACKGROUND OF THE INVENTION

The present invention relates to a light beam synchronization detector for detecting the timing of a light beam spot passing through a prescribed position and a printer and relates to, for example, a light beam synchronization detector that constitutes a synchronization detection circuit used as a synchronization sensor for an optical scanning recorder.

Conventionally, a photodiode is employed as a photodetector for detecting the timing of the passing of a light beam spot in a laser beam printer or the like. That is, a photodiode is arranged in a position where the light beam spot passes, and printing start timing is detected by detecting a change in the photocurrent outputted from the photodiode.

According to this light beam detection method, the photocurrent outputted from the photodiode also changes when the intensity itself of the light beam changes, and the signal level due to this photocurrent also changes. Therefore, when comparing this signal level with a prescribed threshold value and detecting the timing of the passing of the light beam spot over the photodiode, a detection error of the timing occurs due to the change in the signal level.

In order to cancel this error, there is proposed a technique for detecting the aforementioned timing by employing a photodiode as a photodetector whose light-receiving surface is divided into two parts and taking an optical push-pull (refer to, for example, JP 04-247761 A). According to this, the detection timing can be kept constant even if the wave height of the photocurrent outputted from the photodiode changes.

It is sometimes a case where a beam spot is caused by reflected light in an optical path different from the designed prescribed optical path as a consequence of scanning the spot of a light source by means of a polygon mirror in an optical system in which the construction of the light beam synchronization detector is provided by the aforementioned technique and made incident on the photodiode. Although the quantity of light of the beam spot due to this reflected light is sufficiently smaller than the quantity of light of the light beam that should be detected, the quantity of light is disadvantageously detected by this light beam synchronization detector. When the light beam synchronization detector is built in a printer, the detection of the reflected light as described above causes the malfunction of the printer.

Accordingly, in order to prevent the erroneous detection attributed to the reflected light, there is proposed a light beam synchronization detector that does not output a detection signal when a light beam of a quantity of light being not greater than a prescribed threshold value is made incident on the photodiode.

As shown in FIG. 9, in this light beam synchronization detector, the output side of a first photodiode PD1 is connected to a first amplifier 11, and the output side of a second photodiode PD2 is connected to a second amplifier 12. This first amplifier 11 has an output terminal connected to an input terminal of a comparator 13 via a constant-voltage source 14, while the second amplifier 12 has an output terminal connected directly to the other input terminal of the comparator 13. On the other hand, the input side of the first and second photodiodes PD1 and PD2 are grounded via a constant-voltage source 10. As shown in Fig. 10A, the light-receiving surface of the first photodiode PD1 and the light-receiving surface of the second photodiode PD2 are arranged at a prescribed interval in the direction in which the light beam spot indicated by the arrow 21 advances.

In this light beam synchronization detector, the output signal of the first photodiode PD1 is convened from a signal current into a signal voltage by the first amplifier 11, inverted, amplified, further shifted in level by the constant-voltage source 14 and inputted to the comparator 13. On the other hand, the output signal of the second photodiode PD2 is converted from a signal current into a signal voltage by the second amplifier 12, inverted, amplified and inputted to the comparator 13.

The signal waveforms when the light beam spot passes in the direction indicated by the arrow 21 as shown in FIG. 10A are shown in FIG. 10B. In FIG. 10B, the waveform of a signal current 11 due to the output signal of the first photodiode PD1 is indicated by solid lines, and the waveform of a signal current 12 due to the output signal of the second photodiode PD2 is indicated by dashed lines. The waveform of a signal voltage V1 that is outputted from the first amplifier 11 and shifted in level by a threshold value Vth by the constant-voltage source 14 is indicated by solid lines. The waveform of a signal voltage V2 outputted from the second amplifier 12 is indicated by dashed lines.

The signal voltages V1 and V2 are inputted to the comparator 13, and this comparator 13 outputs an output pulse Vout1, which rises at a crossing point X1 of the signal voltage V1 and the signal voltage V2, to an output terminal OUT.

In this case, if a beam spot due to reflection is made incident on the second photodiode PD2 and a protuberance $BS_I$ is caused by the beam spot due to the reflection in the waveform of the signal current I2 as shown in FIG. 10B, then a protuberance $BS_V$ is generated in the waveform of the signal voltage V2. However, when the level of this protuberance $BS_V$ is lower than the threshold value Vth, a protuberance $BS_P$ is not generated in the waveform of the output pulse Vout1.

However, when the signal voltage outputted from the first amplifier 11 is shifted in level by the constant-voltage source 14 as in this light beam synchronization detector, another problem described as follows occurs.

That is, it is difficult to consistently keep the quantity of light of the beam spot constant, and it is required to consider a change to a certain extent. Therefore, if, for example, the light beam intensity of the light beam spot that advances in the direction indicated by the arrow 21 in FIG. 10A changes, then the crest values of the waveforms of the signal currents I1 and I2 change, and the signal voltages V1 and V2 change as indicated by one example as shown in FIG. 10C. That is, the voltage V1 changes like voltages V1a, V1b and V1c, while the voltage V2 changes like voltages V2a, V2b and V2c. With the above voltage changes, the crossing point X1 of the voltages V1 and V2 changes like crossing points X1a, X1b and X1c. That is, the timing of the fall of the detection pulse Vout1 is to change within a time range of ΔX1 by the voltage changes. Therefore, a problem that an error occurs in the detection timing of the light beam spot occurs. Therefore, when this light beam synchronization detector is incorporated into, for example, a printer, the printing start timing shifts and the printed letters disadvantageously become blurred.

SUMMARY OF THE INVENTION

Accordingly, the object of the present invention is to provide a light beam synchronization detector capable of preventing the occurrence of an error in the detection timing of a light beam due to a change in the quantity of light of the light beam and preventing the occurrence of erroneous detection due to reflected light.

In order to achieve the above object, there is provided a light beam synchronization detector comprising:

a first photoelectric converter section and a second photoelectric converter section;

a comparison output section which receives inputs of a first output signal outputted from the first photoelectric convener section and a second output signal outputted from the second photoelectric converter section, compares the first output signal with the second output signal and generates and outputs a light beam detection signal on the basis of a result of the comparison; and a control section which receives inputs of the first output signal outputted from the first photoelectric converter section and the second output signal outputted from the second photoelectric converter section, outputs a first control signal to the comparison output section when at least one of the first output signal and the second output signal exceeds a prescribed threshold value to put the comparison output section into an operative state and outputs a second control signal to the comparison output section when both the first output signal and the second output signal are equal to or lower than the threshold value to put the comparison output section into an inoperative state.

According to the light beam synchronization detector of this invention, the control section outputs the first control signal to the comparison output section when at least one of the first output signal from the first photoelectric converter section and the second output signal from the second photoelectric converter section exceeds the prescribed threshold value, thereby putting the comparison output section into an operative state. The control section outputs the second control signal to the comparison output section when both the first output signal and the second output signal are equal to or lower than the threshold value, thereby putting the comparison output section into an inoperative state.

Therefore, according to this light beam synchronization detector, when a light beam of a quantity of light being not greater than the prescribed quantity of light is incident on both the first photoelectric converter section and the second photoelectric converter section and thus both the first output signal and the second output signal are equal to or lower than the threshold value, the comparison output section does not operate, and no light beam detection signal is outputted.

Therefore, according to the this invention, the erroneous detection due to the reflected light can be prevented without shifting the level of the output signal of the photoelectric converter section dissimilarly to the conventional case, and therefore, the error of the detection timing of the light beam due to the level shift does not occur.

Therefore, according to this invention, there can be provided a light beam synchronization detector capable of preventing the occurrence of an error in the detection timing of the light beam due to the change in the quantity of light of the light beam and preventing the occurrence of the erroneous detection due to the reflected light.

In one embodiment of the present invention, the control section comprises:

a hysteresis setting section for setting hysteresis for the threshold value.

In the light beam synchronization detector of this embodiment, the hysteresis setting section provided for the control section sets hysteresis for the threshold value, and therefore, malfunction due to such a noise light that the first and second output signals become located in the vicinity of the threshold value can be prevented.

In one embodiment of the present invention, the first photoelectric converter section comprises:

a first photoelectric converter and a first voltage converter section that converts a first current signal outputted from the first photoelectric converter into a first voltage signal and outputs the first voltage signal as the first output signal, and the second photoelectric converter section comprises:

a second photoelectric converter and a second voltage converter section that converts a second current signal outputted from the second photoelectric converter into a second voltage signal and outputs the second voltage signal as the second output signal.

According to the light beam synchronization detector of this embodiment, the first and second photoelectric converter sections convert the first and second current signals outputted from the first and second photoelectric converters into the first and second voltage signals and output the voltage signals as the first and second output signals. That is, according to this embodiment, since the first and second output signals are voltage signals, the first and second output signals in the comparison output section and the control section can easily be processed.

In one embodiment of the present invention, the control section comprises:

a first comparator which receives inputs of the first output signal outputted from the first voltage converter section and a threshold voltage as the prescribed threshold value, compares the first output signal with the threshold voltage and outputs a first comparison signal that represents a result of the comparison;

a second comparator which receives inputs of the second output signal outputted from the second voltage converter section and the threshold voltage, compares the second output signal with the threshold voltage and outputs a second comparison signal that represents a result of the comparison; and a control signal generating section which receives inputs of the first comparison signal and the second comparison signal, outputs the first control signal to the comparison output section when the first comparison signal indicates that the first output signal exceeds the threshold voltage or when the second comparison signal indicates that the second output signal exceeds the threshold voltage and outputs the second control signal to the comparison output section when the first comparison signal indicates that the first output signal is not higher than the threshold voltage and the second comparison signal indicates that the second output signal is not higher than the threshold voltage.

In the light beam synchronization detector of this embodiment, the control section is constructed of the first and second comparators and the control signal generating section. The first and second comparators can each be constructed of a voltage comparator, and the control signal generating section can be constructed of, for example, a logic operation circuit.

In one embodiment of the present invention, the control signal generating section comprises:

a logic operation circuit which receives inputs of the first comparison signal and the second comparison signal.

In this embodiment, the control signal generating section can be constructed of a logic operation circuit (AND circuit), and the control signal generating section can be constructed of a simple circuit.

In one embodiment of the present invention, the control signal generating section comprises:

a signal adding section which receives inputs of the first comparison signal and the second comparison signal and outputs an addition signal obtained by adding the first comparison signal to the second comparison signal; and a clamp section which clamps the addition signal outputted from the signal adding section.

According to the light beam synchronization detector of this embodiment, the control signal generating section can be constructed of the signal adding section and the clamp section. Moreover, the level of the addition signal can be limited by clamping the addition signal outputted from the signal adding section in the clamp section.

In one embodiment of the present invention, the comparison output section comprises:

a reference comparator which receives inputs of the first output signal and the second output signal, compares the first and second output signals with respective prescribed reference voltages and outputs first and second reference comparison signals that indicate results of the comparison; and an output circuit which receives inputs of the first and second reference comparison signals from the reference comparator, compares the first reference comparison signal with the second reference comparison signal and generates and outputs a light beam detection signal on the basis of a result of the comparison.

According to the light beam synchronization detector of this embodiment, the comparison output section compares the first and second output signals with the reference voltage by means of the reference comparator and outputs the first and second reference comparison signals. Therefore, it becomes possible to make the first (or second) reference comparison signal have an active level only when, for example, the first (or second) output signal exceeds the reference voltage and make the first (or second) reference comparison signal have an inactive level when the first (or second) output signal is not higher than the reference voltage. Therefore, a fluctuation component not higher than the reference voltage can be removed from the first and second output signals, and the influence of the noise light can be restrained.

In one embodiment of the present invention, the output circuit comprises:

a first input terminal which receives an input of the first reference comparison signal; a second input terminal which receives an input of the second reference comparison signal; a control signal input terminal which receives inputs of the first and second control signals from the control section; an output terminal which outputs the light beam detection signal;

a first transistor having a base connected to the first input terminal and a collector connected to a power source; a second transistor having a base connected to the second input terminal and a collector connected to the power source;

a first resistor having one end connected to an emitter of the first transistor; a second resistor having one end connected to an emitter of the second transistor;

a third transistor having a collector connected to the other end of the first resistor and an emitter grounded; a fourth transistor having a collector connected to the other end of the second resistor, a base connected to a base of the third transistor and an emitter grounded;

a fifth transistor having a collector connected to the power source, a base connected to the other end of the first resistor and an emitter connected to the base of the third transistor;

a third resistor having one end connected to the base of the third transistor and the other end grounded; a fourth resistor having one end connected to the power source;

a sixth transistor having a collector connected to the other end of the fourth resistor and a base connected to the other end of the second resistor; a control signal input transistor having an emitter connected to a base of the sixth transistor, a base connected to the control signal input terminal and a collector grounded;

a fifth resistor having one end connected to an emitter of the sixth transistor and the other end grounded; a sixth resistor having one end connected to the power source and the other end connected to the output terminal; and an output transistor having a collector connected to the output terminal, a base connected to the emitter of the sixth transistor and an emitter grounded, the first through sixth transistors and the output transistor being npn transistors, and the control signal input transistor being a pnp transistor.

According to the light beam synchronization detector of this embodiment, the output circuit can be constructed of seven npn transistors, one pnp transistor and six resistors. Therefore, the response of the output of the light beam detection signal based on the first and second reference comparison signals can be made fast.

In one embodiment of the present invention, the output circuit comprises:

a first transistor having a base connected to the first input terminal and a collector connected to a power source; a second transistor having a base connected to the second input terminal and a collector connected to the power source;

a first resistor having one end connected to an emitter of the first transistor; a second resistor having one end connected to an emitter of the second transistor;

a third transistor having a collector connected to the other end of the first resistor and an emitter grounded; a fourth transistor having a collector connected to the other end of the second resistor, a base connected to a base of the third transistor and an emitter grounded;

a fifth transistor having a collector connected to the power source, a base connected to the other end of the first resistor and an emitter connected to the base of the third transistor;

a third resistor having one end connected to the base of the third transistor and the other end grounded; a fourth resistor having one end connected to the power source;

a sixth transistor having a collector connected to the other end of the fourth resistor and a base connected to the other end of the second resistor;

a control signal input transistor having a collector connected to the power source, a base connected to the control signal input terminal and an emitter connected to an emitter of the first transistor;

a fifth resistor having one end connected to an emitter of the sixth transistor and the other end grounded; a sixth resistor having one end connected to the power source and the other end connected to the output terminal; and an output transistor having a collector connected to the other end of the sixth resistor, a base connected to the emitter of the sixth transistor and an emitter grounded, the first through sixth transistors, the output transistor and the control signal input transistor being npn transistors.

According to the light beam synchronization detector of this embodiment, the transistors that constitute the output circuit can be all provided by npn transistors, and the response to the input signal can be made faster.

In one embodiment of the present invention, an upper limit value of the first and second control signals outputted from the control section is higher than an upper limit value of the first and second reference comparison signals outputted from the reference comparator, and a lower limit value of the first and second control signals outputted from the control section is lower than a lower limit value of the first and second reference comparison signals outputted from the reference comparator.

According to the light beam synchronization detector of this embodiment, changeover between the operative state and the inoperative state of the control section can be effected by the first and second control signals regardless of the output state of the reference comparator.

In one embodiment of the present invention, the light beam synchronization detector further comprises a clamp section which clamps a collector voltage of the fourth transistor so that the collector voltage is prevented from being saturated.

According to the light beam synchronization detector of this embodiment, the collector voltage of the fourth transistor can be prevented from being saturated by the clamp section, and the response characteristic of the output circuit can be prevented from deteriorating.

Moreover, the printer of one embodiment is provided with the aforementioned light beam synchronization detector.

According to the printer of this embodiment, the occurrence of an error in the detection timing of the light beam due to the change in the quantity of light of the light beam can be prevented, and the occurrence of erroneous detection due to the reflected light can be prevented. Therefore, printing start timing during high-precision printing can easily be obtained.

According to the light beam synchronization detector of this invention, when a light beam of a quantity of light being not greater than the prescribed quantity of light is incident on both the first photoelectric converter section and the second photoelectric converter section and thus both the first output signal and the second output signal are equal to or lower than the threshold value, the comparison output section does not operate, and no light beam detection signal is outputted. Therefore, according to this invention, the erroneous detection due to the reflected light can be prevented without shifting the level of the output signal of the photoelectric converter section dissimilarly to the conventional case. Therefore, also the error of the detection timing of the light beam due to the level shift does not occur. Consequently, according to this invention, there can be provided a light beam synchronization detector capable of preventing the occurrence of an error in the detection timing of the light beam due to the change in the quantity of light of the light beam and preventing the occurrence of the erroneous detection due to the reflected light.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
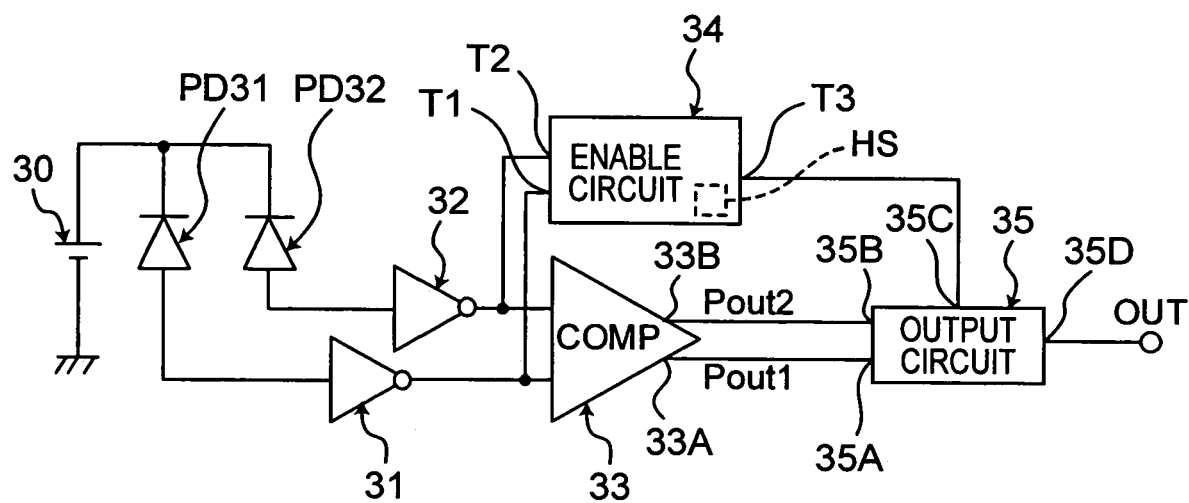
FIG. 1 is a block diagram showing the construction of a first embodiment of the light beam synchronization detector of the present invention.

The present invention will be described in detail below on the basis of the embodiments shown in the drawings.

The First Embodiment

FIG. 1A and FIG. 1B show the first embodiment of the light beam synchronization detector of the present invention. This first embodiment is provided with a first photodiode PD31 that serves as a first photoelectric converter and a second photodiode PD32 that serves as a second photoelectric converter. This first photodiode PD31 has a cathode connected to the positive pole of a constant-voltage source 30, and the first photodiode PD31 has an anode connected to the input terminal of a first amplifier 31 that serves as a first signal converter. The second photodiode PD32 has a cathode connected to the positive pole of the constant-voltage source 30, while the second photodiode PD32 has an anode connected to the input terminal of the second amplifier 32 that serves as a second signal convener. The negative pole of the constant-voltage source 30 is grounded.

The first photodiode PD31 and the first amplifier 31 constitute a first photoelectric converter section, while the second photodiode PD32 and the second amplifier 32 constitute a second photoelectric converter section.

The first amplifier 31 has an output terminal connected to one input terminal of two input terminals of a reference comparator 33, while the second amplifier 32 has an output terminal connected to the other input terminal of the reference comparator 33. The first amplifier 31 and the second amplifier 32 have output terminals connected to input terminals T1 and T2, respectively, of an enable circuit 34 that serves as a control section. This enable circuit 34 has an output terminal T3 connected to a control signal input terminal 35C of an output circuit 35. The reference comparator 33 and the output circuit 35 constitute a comparison output section.

The reference comparator 33 has a first output terminal 33A connected to a first input terminal 35A of the output circuit 35, and the reference comparator 33 has a second output terminal 33B connected to a second input terminal 35B of the output circuit 35. This output circuit 35 has an output terminal 35D connected to an output terminal OUT of this light beam synchronization detector. A light beam detection signal is outputted from this output terminal OUT.

Figure 3A:
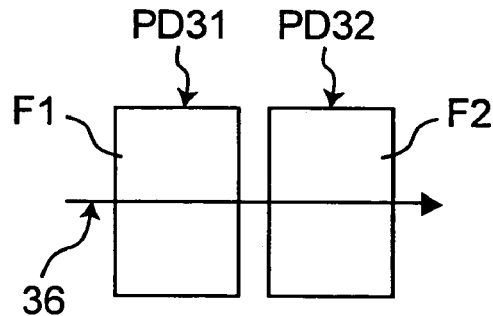
FIG. 3A is a view showing the layout of photodiodes in the first embodiment.

As shown in FIG. 3A, in this light beam synchronization detector, a light-receiving surface F1 of the first photodiode PD1 and a light-receiving surface F2 of the second photodiode PD2 are arranged at a prescribed interval along a direction 36 in which the light beam spot advances.

Figure 3B:
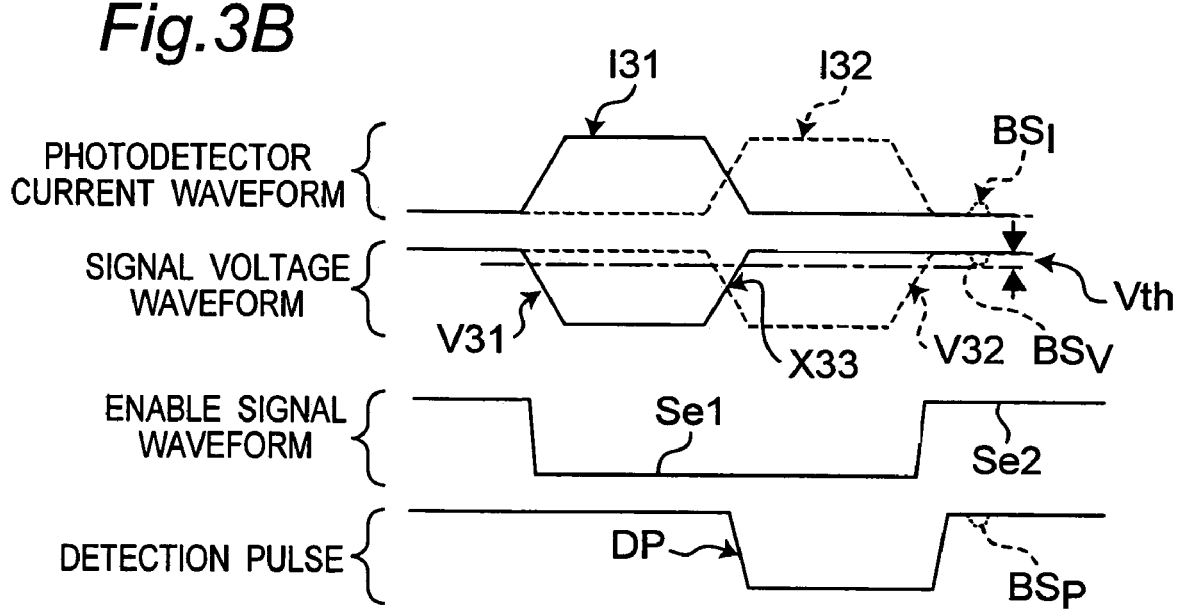
FIG. 3B is a waveform chart showing a photodetector current waveform, a signal voltage waveform, an enable signal waveform and a detection pulse waveform in the first embodiment.

If this light beam spot is made incident on the light-receiving surface F1 of the first photodiode PD1, then the first photodiode PD1 generates a first current signal I31 as shown in FIG. 3B. This first current signal I31 is inputted to the first amplifier 31, amplified by this first amplifier 31, inverted and outputted as a first voltage signal V31. This first voltage signal V31 serves as a first output signal Aout1.

When the light beam spot is made incident on the light-receiving surface F2 of the second photodiode PD2, then the second photodiode PD2 generates a second current signal I32 as shown in FIG. 3B. This second current signal I32 is inputted to the second amplifier 32, amplified by this second amplifier 32, inverted and outputted as a second voltage signal V32. This second voltage signal V32 serves as a second output signal Aout2.

The first voltage signal V31 (first output signal Aout1) outputted from the first amplifier 31 is inputted to the first input terminal T1 of the enable circuit 34, while the second voltage signal V32 (second output signal Aout2) outputted from the second amplifier 32 is inputted to the second input terminal T2 of the enable circuit 34. As shown in FIG. 3B, if the first voltage signal V31 falls below a threshold voltage −Vth, then the enable circuit 34 lowers an enable signal Se outputted from the output terminal T3 and inputs a first control signal Se1 to the control signal input terminal 35C of the output circuit 35. Then, the output circuit 35 enters an operative state.

Moreover, the first and second voltage signals V31 and V32 are inputted to the reference comparator 33. This reference comparator 33 compares the absolute value of the first voltage signal V31 with a prescribed threshold voltage, thereby makes a first reference comparison signal Pout1 have L-level when the absolute value of the first voltage signal V31 exceeds the above-mentioned threshold voltage and makes the first reference comparison signal Pout1 have H-level when the absolute value does not exceed the threshold voltage. Moreover, the reference comparator 33 compares the absolute value of the second voltage signal V32 with a prescribed threshold voltage, thereby makes a second reference comparison signal Pout2 have L-level when the absolute value of the second voltage signal V32 exceeds the above-mentioned threshold voltage and makes the second reference comparison signal Pout2 have H-level when the absolute value does not exceed the threshold voltage.

Then, the first reference comparison signal Pout1 outputted from this reference comparator 33 is inputted to the first input terminal 35A of the output circuit 35, while the second reference comparison signal Pout2 is inputted to the second input terminal 35B.

This output circuit 35 compares the first reference comparison signal Pout1 with the second reference comparison signal Pout2 and outputs a detection pulse DP that falls when the absolute value of the second reference comparison signal Pout2 becomes greater than the absolute value of the first reference comparison signal Pout1 (X33) as a light beam detection signal from the output terminal 35D.

When the light beam spot passes over the light-receiving surface F2 of the second photodiode PD2, then the second current signal I32 falls, and the second voltage signal V32 rises. When the second voltage signal V32 becomes equal to or higher than the threshold voltage −Vth shown in FIG. 2B, then both the first voltage signal V31 and the second voltage signal V32 become equal to or higher than the threshold voltage −Vth. Therefore, the enable circuit 34 raises the enable signal Se to input a second control signal Se2 to the control signal input terminal 35C of the output circuit 35. Then, the output circuit 35 enters an inoperative state. As a result, the output of the output circuit 35 is fixed to H-level (zero voltage).

As described above, according to the light beam synchronization detector of this embodiment, the enable circuit 34, which constitutes the control section, outputs the first control signal Se1 to the output circuit 35 when at least one of the absolute value of the first voltage signal V31 from the first amplifier 31 and the absolute value of the second voltage signal V32 from the second amplifier 32 exceeds the absolute value of the threshold voltage −Vth, thereby putting the output circuit 35 into the operative state. The enable circuit 34 outputs the second control signal Se2 to the output circuit 35 when the absolute values of both the first output voltage V31 and the second output voltage V32 are equal to or lower than the absolute value of the threshold voltage −Vth, thereby putting the output circuit 35 into the inoperative state.

Therefore, according to this light beam synchronization detector, when a light beam of a quantity of light being not greater than a prescribed value is incident on each of both the first photodiode PD1 and the second photodiode PD2 and thus both the absolute value of the first output voltage V31 and the absolute value of the second output voltage V32 are equal to or lower than the absolute value of the threshold voltage −Vth, then the output circuit 35 does not operate, and the detection pulse DP, which is the light beam detection signal, is not outputted.

Therefore, even if reflected light (noise light) is incident on the first photodiode PD1 as shown in FIG. 3B, a protuberance $BS_I$ is generated in the first current signal I31 and a protuberance $BS_V$ is generated in the first voltage waveform V31, the enable circuit 34 does not output the first control signal Se1 to the output circuit 35 when the absolute value of this protuberance $BS_V$ is smaller than the absolute value of the threshold voltage −Vth, and the output circuit 35 is in the inoperative state. Therefore, according to this embodiment, the erroneous detection due to the reflected light can be prevented without shifting the level of the output signal of the photoelectric converter section dissimilarly to the conventional case.

Figure 3C:
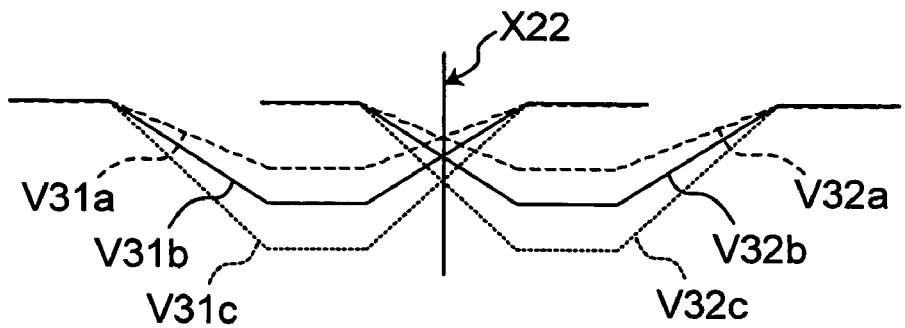
FIG. 3C is a waveform chart showing changes in the signal voltage waveform when the quantity of light of the light beam is changed.

Moreover, according to this embodiment, the level of the output signal of the photoelectric converter section is not shifted dissimilarly to the conventional case, and therefore, no error occurs in the detection timing of the light beam even if the change in the quantity of light of the light beam spot occurs. That is, as shown in FIG. 3C, even when the first voltage signal V31 and the second voltage signal V32 change like V31a, V31b and V31c and V32a, V32b and V32c, a time X22 at the crossing point of the first voltage signals V31a, V31b and V31c and the second voltage signals V32a, V32b and V32c does not change.

Therefore, according to this embodiment, there can be provided a light beam synchronization detector capable of preventing the occurrence of an error in the detection timing of the light beam due to the change in the quantity of light of the light beam and preventing the occurrence of the erroneous detection due to the reflected light.

In the aforementioned embodiment, the absolute value of the threshold voltage Vth in the enable circuit 34 should preferably be made smaller than the absolute value of the output voltage of the first amplifier 31 (or the second amplifier 32) when a quantity of light being not greater than a half of the quantity of light of the light beam spot is incident on the first photodiode PD1 (or PD2). The above is because the output circuit 35 enters the inoperative state (enable state) at the time X22 of the crossing point when the absolute value of this threshold voltage Vth is set equal to or greater than the absolute value of the output voltage, and a normal detection pulse cannot be obtained. The quantity of light of the beam spot due to actual reflection is not greater than a half of the quantity of light of the beam spot that should be detected, and therefore, the influence of the reflected beam spot can be eliminated even when the above-mentioned setting is done.

Figure 2A:
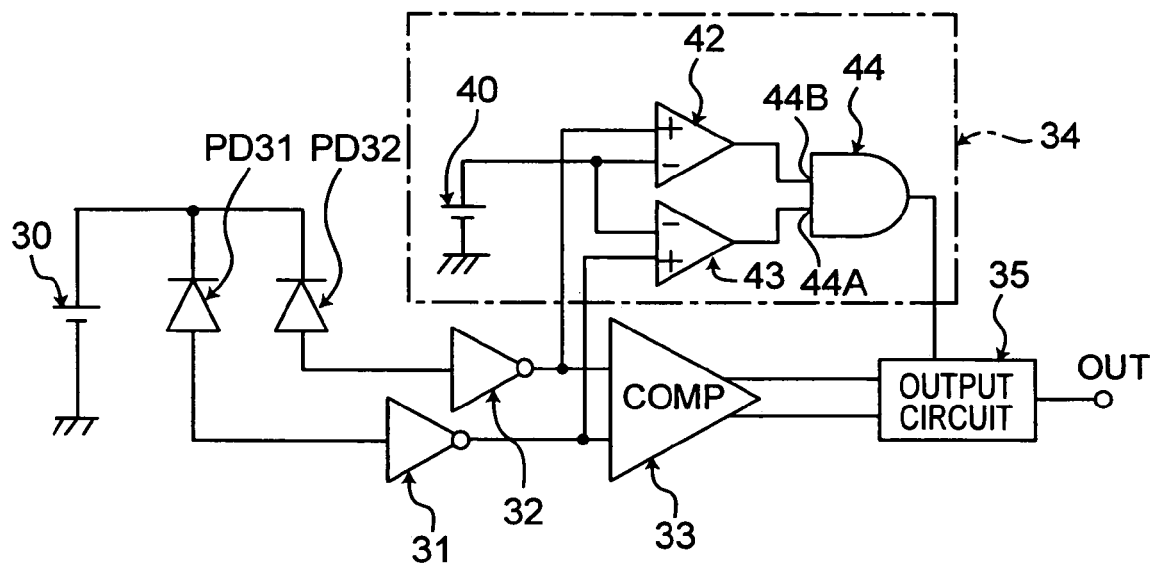
FIG. 2A is a block diagram showing one example of the construction of an enable circuit in the first embodiment.

Next, one example of the construction of the enable circuit 34 as the control section is shown with reference to FIG. 2A. This enable circuit 34 has a first comparator 43, a second comparator 42, an AND circuit 44 that serves as a control signal generating section and a reference voltage source 40. The first comparator 43 has a non-inverted input terminal connected to the output terminal of the first amplifier 31, and the first comparator 43 has an inverted input terminal connected to the positive pole of the reference voltage source 40. This first comparator 43 has an output terminal connected to an input terminal 44A of the AND circuit 44. The reference voltage source 40 has a negative pole grounded.

Moreover, the second comparator 42 has a non-inverted input terminal connected to the output terminal of the second amplifier 32, and the second comparator 42 has an inverted input terminal connected to the positive pole of the reference voltage source 40. This second comparator 42 has an output terminal connected to another input terminal 44B of the AND circuit 44. This AND circuit 44 has an output terminal connected to the control signal input terminal 35C of the output circuit 35.

In this enable circuit 34, when the first and second voltage signals V31 and V32 are higher than −Vth obtained by inverting the threshold voltage Vth from the reference voltage source 40, then the first and second comparators 43 and 42 output H-level signals as first and second comparison signals. That is, if there is no light during which no light beam spot is incident on both the first and second photodiodes PD1 and PD2 or when reflected light (noise light) is incident on the first and second photodiodes and the absolute values of the first and second voltage signals V31 and V32 are each smaller than the threshold voltage Vth, then the first and second comparators 43 and 42 output H-level signals as the first and second comparison signals.

Then, the AND circuit 44 outputs an H-level signal that serves as a second control signal to the output circuit 35, thereby putting the output circuit 35 into the inoperative state.

When the first voltage signal V31 becomes lower than −Vth, then the first comparator 43 outputs an L-level signal. When the second voltage signal V32 becomes lower than −Vth, then the second comparator 43 outputs an L-level signal. Therefore, if at least one of the first and second voltage signals V31 and V32 becomes lower than −Vth, then the AND circuit 44 outputs an L-level signal that serves as a first control signal to the output circuit 35, thereby putting the output circuit 35 into the operative state.

When a NAND circuit is provided in place of the AND circuit 44, the enable circuit 34 outputs the H-level signal as the first control signal and outputs the L-level signal as the second control signal. Therefore, in this case, the output circuit 35 serves as an output circuit that enters the operative state when the H-level signal is inputted and enters the inoperative state when the L-level signal is inputted. As described above, it is acceptable to invert the logic values of the first control signal and the second control signal according to an output circuit enabling system.

Moreover, the enable circuit 34 that serves as the control section may be provided with a hysteresis setting section HS that sets hysteresis for the threshold voltage Vth. In this case, by setting hysteresis for the threshold voltage Vth by this hysteresis setting section HS, there can be prevented malfunction due to such a noise light that the first and second voltage signals V31 and V32 become located in the vicinity of the threshold voltage Vth.

Figure 2B:
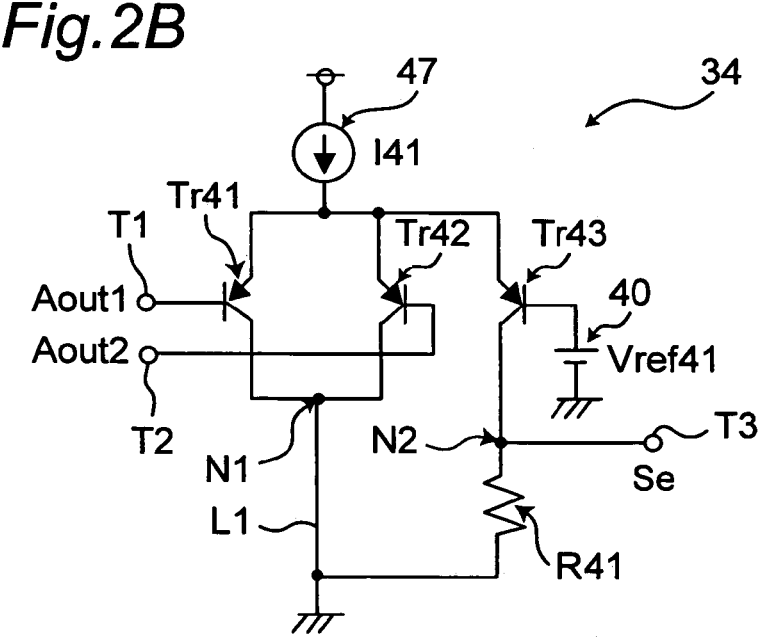
FIG. 2B is a circuit diagram of the above enable circuit.

Next, one example of the concrete circuit of the enable circuit 34 is shown in FIG. 2B. This enable circuit 34 has a first input terminal T1 connected to the output terminal of the first amplifier 31, a second input terminal T2 connected to the output terminal of the second amplifier 32 and an output terminal T3 connected to the control signal input terminal 35C of the output circuit 35.

The base of a pnp transistor Tr41 is connected to the first input terminal T1, and the emitter of this pnp transistor Tr41 is connected to a constant-current source 47. The base of a pnp transistor Tr42 is connected to the second input terminal T2, and the emitter of this pnp transistor Tr42 is connected to the constant-current source 47. This constant-current source 47 is connected to a terminal of the power source voltage.

Moreover, the collector of the pnp transistor Tr41 and the collector of the pnp transistor Tr42 are connected to each other at a junction point N1, and this junction point N1 is grounded via a connection line L1. The emitter of a pnp transistor Tr43 is connected to the lower voltage side of the constant-current source 47, the collector of this pnp transistor Tr43 is connected to a resistor R41 at a junction point N2, and this resistor R41 is connected to the connection line L1. The base of the pnp transistor Tr43 is connected to the positive pole of the reference voltage source 40 of the voltage Vref 41, and the negative pole of this reference voltage source 40 is grounded. The junction point N2 is connected to the output terminal T3.

The transistors Tr41 and Tr43 produce the function of the first comparator 43, and the transistors Tr42 and Tr43 produce the function of the second comparator 42. The junction point N2 of the resistor R41 and the collector of the transistor Tr43 constitutes the output terminal of the AND circuit 44.

In the construction of this enable circuit 34, the base voltage of the transistor Tr41 is compared with the base voltage of the transistor Tr43, and a constant current I41 flows through the transistor Tr41 or Tr43 of the lower base voltage. Likewise, the constant current I41 flows through the transistor Tr42 or Tr43 of the lower base voltage.

In this case, the emitters of the transistors Tr41, Tr42 and Tr43 are common, and therefore, the constant current I41 consequently flows from the constant-current source 47 through only the transistor of the lowest base voltage among the transistors Tr41 through Tr43.

In this case, in the period during which light is not incident on both the photodiodes PD31 and PD32, the voltage Vref 41, which is the base voltage of the transistor Tr43 among the base voltages of the transistors Tr41 through Tr43, becomes the lowest, and the constant current I41 flows through the transistor Tr43. As a result, the product of the constant current I41 and the resistance R41 is outputted as an H-level signal, i.e., the second control signal to the output terminal T3. This second control signal corresponds to the H-level signal of the AND circuit 44.

When a light beam is made incident on either one of the photodiodes PD31 and PD32 and the base voltage of the transistor Tr41 or Tr42 becomes lower than the reference voltage Vref 41, then the constant current I41 flows through the transistor Tr41 or Tr42, and no constant current flows through the transistor Tr43. At this time, no constant current flows through the resistor R41, and therefore, the junction point N2 comes to have the ground level. Through this operation, an L-level signal is outputted as the first control signal to the output terminal T3.

The Second Embodiment

Figure 4A:
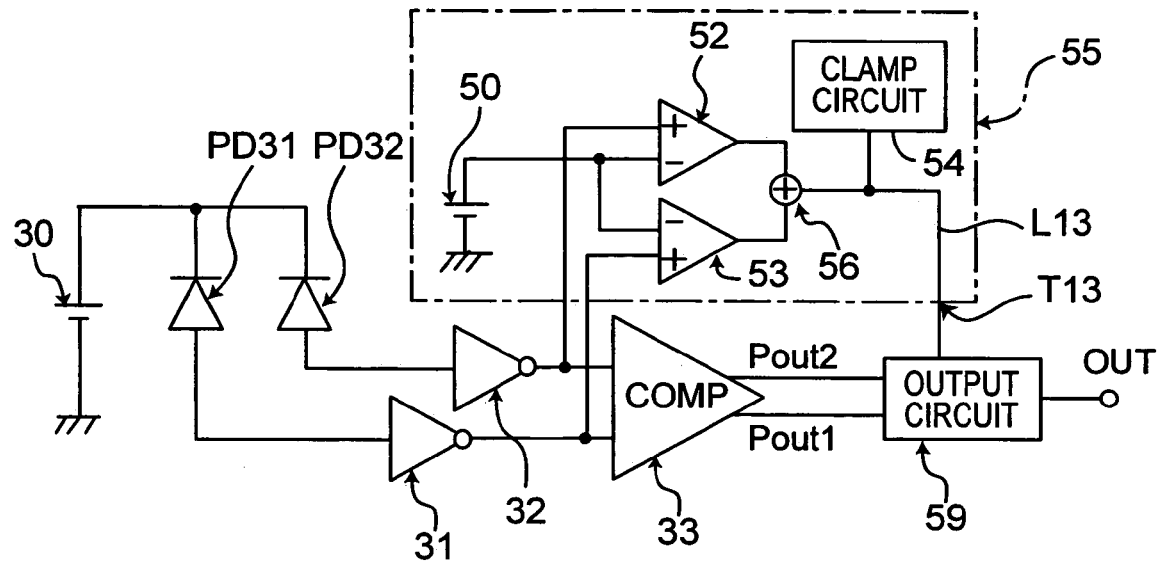
FIG. 4A is a block diagram showing the construction of a second embodiment of the light beam synchronization detector of the present invention.
Figure 4B:
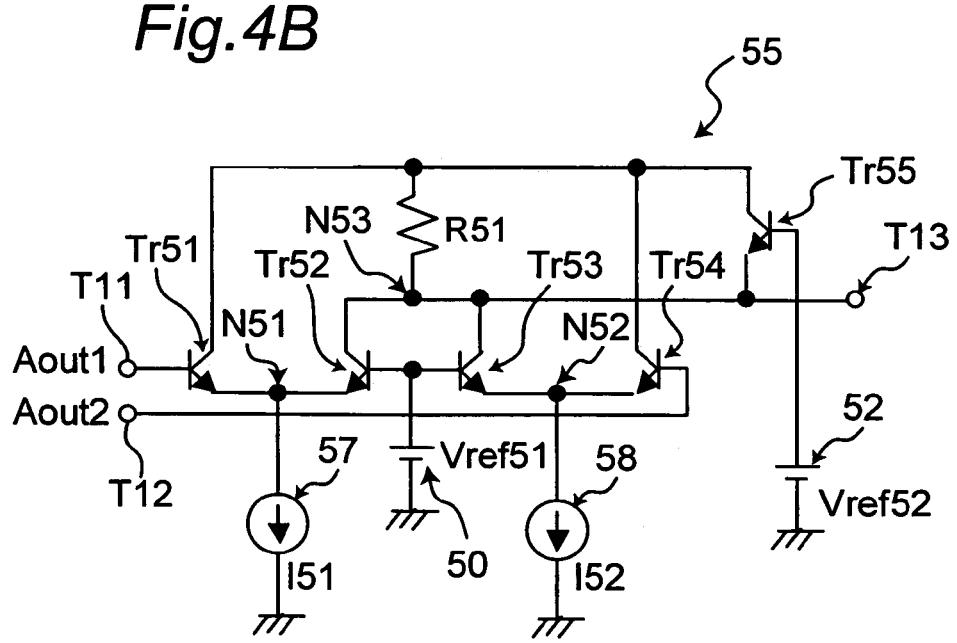
FIG. 4B is a circuit diagram of an enable circuit in the second embodiment.

Next, the second embodiment of the light beam synchronization detector of the present invention is shown in FIG. 4A and FIG. 4B. This second embodiment differs from the aforementioned first embodiment only in that an enable circuit 55 is provided in place of the enable circuit 34 and an output circuit 59 is provided in place of the output circuit 35. This enable circuit 55 differs from the enable circuit 34 only in that an adder 56 and a clamp circuit 54 are provided in place of the AND circuit 44, a reference voltage source 50 is provided in place of the reference voltage source 40, and comparators 52 and 53 are provided in place of the comparators 42 and 43.

As shown in FIG. 4A, the output terminal of the first comparator 53 and the output terminal of the second comparator 52 are connected to the input terminal of the adder 56, and the output terminal of this adder 56 is connected to the output terminal T13 of the enable circuit 55 via a connection line L13. The clamp circuit 54 is connected to this connection line L13.

A reference voltage Vref 51 outputted from the reference voltage source 50 to the comparators 53 and 52 are set to a voltage such that the output signal of the comparator 53 (or the comparator 52) is inverted when a quantity of light being not greater than a half of the quantity of light of a prescribed light beam spot is made incident on the first photodiode PD31 (or the second photodiode PD32).

In this enable circuit 55, the adder 56 adds first and second comparison signals outputted from the two of the first and second comparators 53 and 52 and outputs this addition signal.

In this enable circuit 55, when both of the quantity of light incident on the first photodiode PD31 and the quantity of light incident on the second photodiode PD32 are each not greater than a half of the quantity of light of the prescribed quantity of light, the first comparator 53 outputs an H-level signal, and the second comparator 52 outputs an H-level signal. In this case, the adder 56 adds up the above-mentioned two H-level signals and outputs the resulting signal. In this case, the H-level signal is assumed to be the zero voltage. Therefore, the H-level signal is consequently inputted as the second control signal from the output terminal T13, and the output circuit 59 enters the inoperative state.

When the light beam spot is made incident on either one of the first photodiode PD1 and the second photodiode PD2, then either one of the first comparator 53 and the second comparator 52 outputs an L-level signal, and the other one outputs an H-level signal. Then, the adder 56 adds up the H-level signal of the zero voltage to the L-level signal of the negative voltage and outputs the L-level signal as the first control signal. The L-level signal is inputted from the output terminal T13 to the output circuit 59, and the output circuit 59 enters the operative state.

When the light beam spot comes to a position intermediate between the first photodiode PD1 and the second photodiode PD2, half the quantity of light of the light beam spot is incident on each of the two photodiodes PD1 and PD2. At this time, the two comparators 53 and 52 try to output the L-level signal, and the adder 56 tries to output a signal obtained by doubling the negative voltage of one L-level signal. However, the output of the adder 56 is clamped by the clamp circuit 54, and an L-level signal of which the absolute value is smaller than the value obtained by doubling the negative voltage is outputted as the first control signal to the output circuit 59. As a result, the output circuit 59 enters the operative state.

Next, one example of the concrete circuit of the enable circuit 55 is shown in FIG. 4B. This enable circuit 55 has a first input terminal T11 connected to the output terminal of the first amplifier 31 and has a second input terminal T12 connected to the output terminal of the second amplifier 32. This first input terminal T11 is connected to the base of an npn transistor Tr51. The reference voltage source 50 is connected to the base of an npn transistor Tr52, and the emitter of the transistor Tr51 is connected to the emitter of the transistor Tr52 at a junction point N51. This junction point N51 is connected to a constant-current source 57. The transistors Tr51 and Tr52 constitute the first comparator 53.

Moreover, the base of an npn transistor Tr54 is connected to the second input terminal T12, and the base of an npn transistor Tr53 is connected to the reference voltage source 50. Then, the emitter of the transistor Tr54 is connected to the emitter of the transistor Tr53 at a junction point N52. This junction point N52 is connected to a constant-current source 58. The transistors Tr53 and Tr54 constitute the second comparator 52.

Moreover, the collector of the transistor Tr52 is connected to the collector of the transistor Tr53 at a junction point N53, and one end of a resistor R51 is connected to this junction point N53. This junction point N53 is used as the output of the adder 56. Further, the emitter of an npn transistor Tr55 is connected to the collector of the transistor Tr52 and the collector of the transistor Tr53, and the base of the transistor Tr55 is connected to a reference voltage source 52. This transistor Tr55 constitutes the clamp circuit 54.

When there is no light (i.e., in a state in which the light beam spot is not incident on the first and second photodiodes PD31 and PD32), a voltage Aout1 outputted from the first amplifier 31 and a voltage Aout2 outputted from the second amplifier 32 are each higher than the reference voltage Vref 51 of the reference voltage source 50. Therefore, constant currents I51 and I52 due to the constant-current sources 57 and 58 do not flow through the transistors Tr52 and Tr53 of this enable circuit 55, and the output of the adder 56 comes to have H-level.

When the light beam spot is made incident on the first photodiode PD31, then the output voltage of the first amplifier 31 is lowered and becomes lower than the reference voltage Vref 51. Therefore, a constant current I51 flows through the transistor Tr52. Then, a voltage, which is lowered by a voltage expressed by the product of the constant current I51 and the resistance R51 from the power voltage Vref 52, is produced as the output of the adder 56 at the junction point N53.

Likewise, when the light beam spot is made incident on the second photodiode PD32, then the output voltage of the second amplifier 32 is lowered and becomes lower than the reference voltage Vref 51. Therefore, a constant current I52 flows through the transistor TrS3. Then, a voltage, which is lowered by a voltage expressed by the product of the constant current I52 and the resistance R51 from the power voltage Vref 52, is produced as the output of the adder 56 at the junction point N53.

Further, when the light beam spot comes to a position intermediate between the two photodiodes PD31 and PD32, constant currents I51 and I52 flow through the collectors of the transistors Tr52 and Tr53. Then, the output of the adder 56 is not made to have the voltage that is lowered by the voltage expressed by the product of the sum of the currents I51 and I52 and the resistance R51 but clamped to the voltage that is lowered by Vbe (voltage across the base and the emitter) of the transistor Tr55 from the reference voltage Vref 52 due to the connection of the emitter of the transistor Tr55 to the junction point N53. That is, the output of the adder 56 is lowered in proportion to the current that flows through the resistor R51, whereas the voltage at the output terminal T13 is fixed due to the occurrence of the voltage across the emitter and the base of the transistor Tr55 and the consequent supply of a current from the transistor Tr55 to the junction point N53.

When the adder 56 is employed as in this enable circuit 55, an enable signal close to the two values of the first control signal and the second control signal can be obtained by employing the clamp circuit 54.

(Circuit Configuration of Output Circuit)

Figure 5:
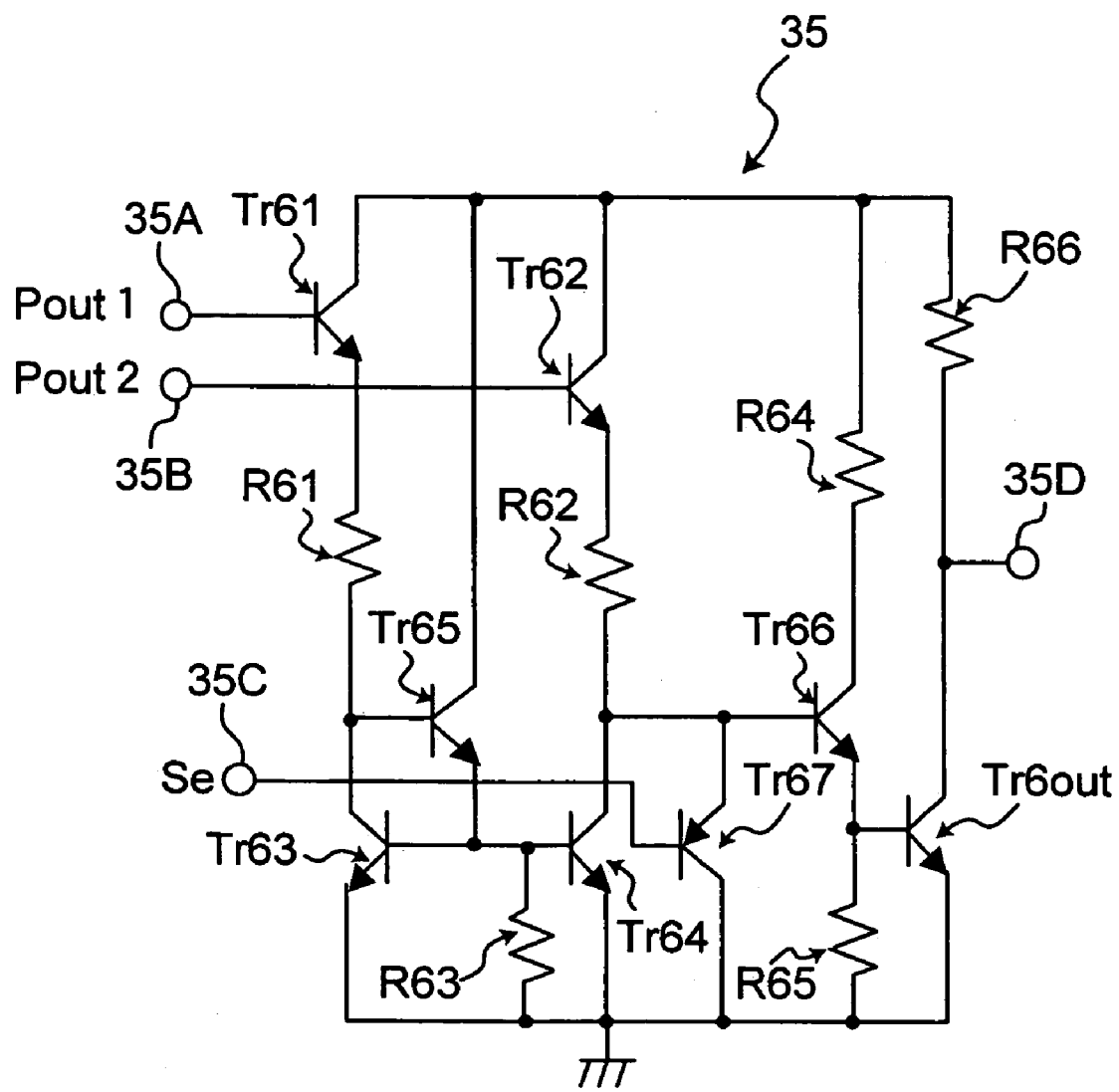
FIG. 5 is a circuit diagram showing one example of an output circuit 35 in the first embodiment.

Next, one example of the circuit configuration of the output circuit 35 of the first embodiment is shown in FIG. 5.

This output circuit 35 has a first input terminal 35A connected to the first output terminal 33A of the reference comparator 33 and a second input terminal 35B connected to the second output terminal 33B. There are further provided a control signal input terminal 35C that receives an input of a control signal from the enable circuit 34 and an output terminal 35D that outputs a light beam detection signal.

This output circuit 35 has a first transistor Tr61 that has a base connected to the first input terminal 35A and a collector connected to the power source and a second transistor Tr62 that has a base connected to the second input terminal 35B and a collector connected to the power source. Moreover, this output circuit 35 has a first resistor R61 that has one end connected to the emitter of the first transistor Tr61 and a second resistor R62 that has one end connected to the emitter of the second transistor Tr62.

Moreover, this output circuit 35 has a third transistor Tr63 that has a collector connected to the other end of the first resistor R61 and an emitter grounded and a fourth transistor Tr64 that has a collector connected to the other end of the second resistor R62, a base connected to the base of the third transistor Tr63 and an emitter grounded.

Moreover, this output circuit 35 has a fifth transistor Tr65 that has a collector connected to the power source, a base connected to the other end of the first resistor R61 and an emitter connected to the base of the third transistor Tr63. Moreover, this output circuit 35 has a third resistor R63 that has one end connected to the base of the third transistor Tr63 and the other end grounded and a fourth resistor R64 that has one end connected to the power source.

Moreover, this output circuit 35 has a sixth transistor Tr66 that has a collector connected to the other end of the fourth resistor R64 and a base connected to the other end of the second resistor R62 and a control signal input transistor Tr67 that has an emitter connected to the base of the sixth transistor Tr66, a base connected to the control signal input terminal 35C and a collector grounded.

Moreover, this output circuit 35 has a fifth resistor R65 that has one end connected to the emitter of the sixth transistor Tr66 and the other end grounded and a sixth resistor R66 that has one end connected to the power source and the other end connected to the output terminal 35D. Moreover, this output circuit 35 has an output transistor Tr6out that has a collector connected to the output terminal 35D, a base connected to the emitter of the sixth transistor Tr66 and an emitter grounded.

The first through sixth transistors Tr61 through Tr66 and the output transistor Tr6out are npn transistors, and the control signal input transistor Tr67 is a pnp transistor.

The operation of this output circuit 35 will be described next. The first reference comparison signal Pout1 outputted from the first output terminal 33A of the reference comparator 33 in the preceding stage is inputted to the base of the first transistor Tr61. The second reference comparison signal Pout2 from the second output terminal 33B of the reference comparator 33 is inputted to the base of the second transistor Tr62.

This first reference comparison signal Pout1 is a signal that comes to have L-level when the quantity of light incident on the first photodiode PD31 exceeds a prescribed value and comes to have H-level when the quantity of light does not exceed the prescribed value. The second reference comparison signal Pout2 is a signal that comes to have L-level when the quantity of light incident on the second photodiode PD32 exceeds a prescribed value and comes to have H-level when the quantity of light does not exceed the prescribed value.

In this case, assuming that the resistance values of the resistor R61 and resistor R62 are equal to each other, the voltage of the first reference comparison signal Pout1 is V61, the voltage of the second reference comparison signal Pout2 is V62, the base voltage of the transistor Tr66 is V66b, a voltage across the base and the emitter of the transistors Tr63 and a voltage across the base and the emitter of the transistors Tr65 are Vbe63 and Vbe65, respectively, then the following equation (1) holds.

$$V66b = Vbe63 + Vbe65 + (V62 - V61) \quad (1)$$

With this arrangement, the output (light beam detection signal) of this output circuit 35 comes to have L-level as a consequence of the turning-on of the output transistor Tr6out when the voltage V62 of the second reference comparison signal Pout2 is greater than the voltage V61 of the first reference comparison signal Pout1. When the voltage V62 is smaller than the voltage V61, the output transistor Tr6out is turned off, and the light beam detection signal of the output circuit 35 comes to have H-level.

The enable control of this output circuit 35 will be described next. The enable control of the output circuit 35 is executed by a voltage inputted to the base of the control signal input transistor Tr67 with a control signal (first control signal (L-level signal) and a second control signal (H-level signal)) inputted from the enable circuit 34 to the control signal input terminal 35C.

That is, when the enable circuit 34 outputs the second control signal (H-level signal) in order to put the output circuit 35 into the inoperative state, then a voltage close to the ground voltage is inputted to the base of the transistor Tr67. Then, the transistor Tr67 is turned on to compulsorily fix the base voltage V66b of the transistor Tr66 to a voltage at which the output transistor Tr6out is not turned on, so that the output level of this output circuit 35 comes to have H-level. When the enable circuit 34 outputs the first control signal (L-level signal) to put the output circuit 35 into the operative state, then the transistor Tr67 is turned off to put the output circuit 35 into the operative state. It is only required to set this L-level signal to at least two or more times the voltage Vbe across the base and the emitter as a voltage to be applied to the base of the transistor Tr67.

Figure 6:
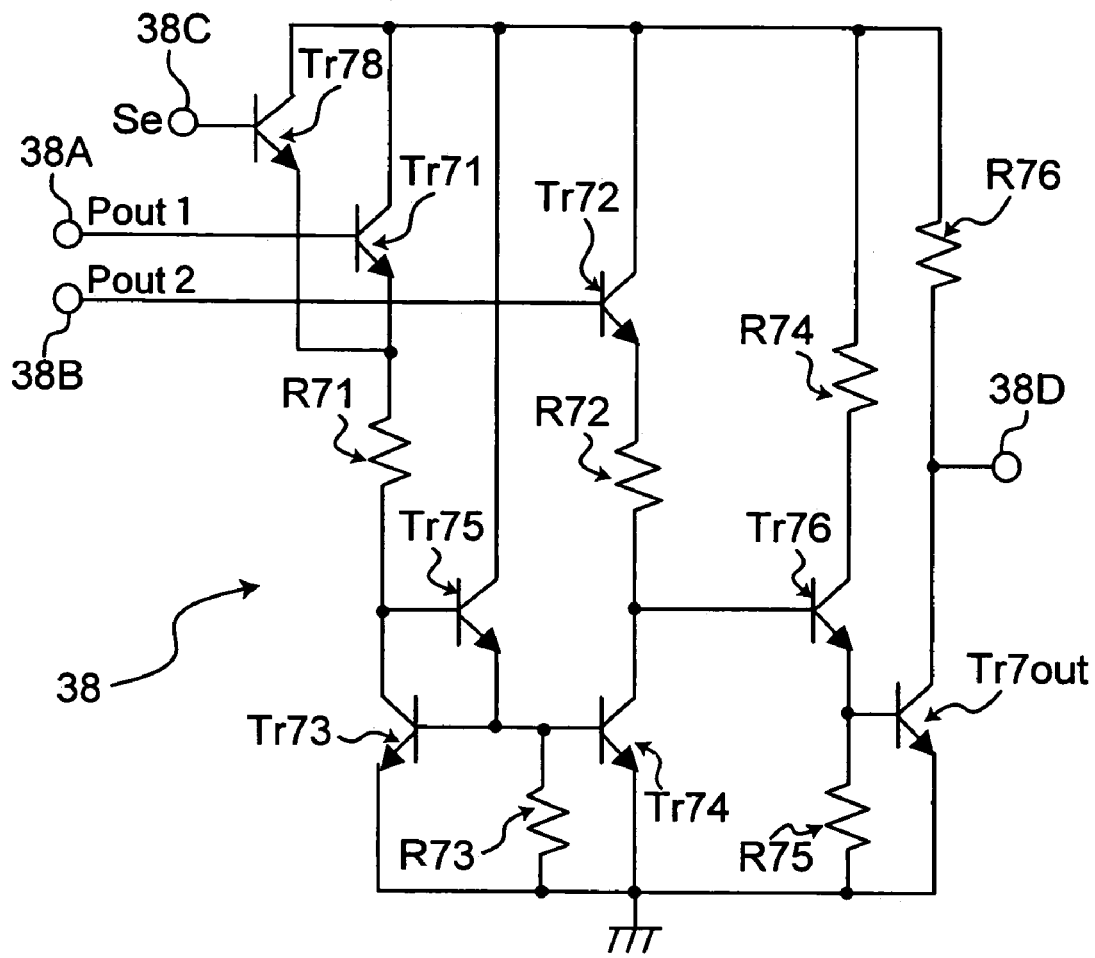
FIG. 6 is a circuit diagram showing another one example of the output circuit.

Next, the circuit configuration of an output circuit 38 that serves as a modification example of the output circuit 35 is shown in FIG. 6. This output circuit 38 has a first transistor Tr71 that has a base connected to the first input terminal 38A and a collector connected to the power source and a second transistor Tr72 that has a base connected to the second input terminal 38B and a collector connected to the power source.

The first reference comparison signal Pout1 from the first output terminal 33A of the reference comparator 33 is inputted to the first input terminal 38A, while the second reference comparison signal Pout2 from the second output terminal 33B of the reference comparator 33 is inputted to the second input terminal 38B.

Moreover, this output circuit 38 has a first resistor R71 that has one end connected to the emitter of the first transistor Tr71 and a second resistor R72 that has one end connected to the emitter of the second transistor Tr72.

Moreover, this output circuit 38 has a third transistor Tr73 that has a collector connected to the other end of the first resistor R71 and an emitter grounded and a fourth transistor Tr74 that has a collector connected to the other end of the second resistor R72, a base connected to the base of the third transistor Tr73 and an emitter grounded.

Moreover, this output circuit 38 has a fifth transistor Tr75 that has a collector connected to the power source, a base connected to the other end of the first resistor R71 and an emitter connected to the base of the third transistor Tr73.

Moreover, this output circuit 38 has a third resistor R73 that has one end connected to the base of the third transistor Tr73 and the other end grounded and a fourth resistor R74 that has one end connected to the power source.

Moreover, this output circuit 38 has a sixth transistor Tr76 that has a collector connected to the other end of the fourth resistor R74 and a base connected to the other end of the second resistor R72. Moreover, this output circuit 38 has a control signal input transistor Tr78 that has a collector connected to the power source, a base connected to the control signal input terminal 38C and an emitter connected to the emitter of the first transistor Tr71. A control signal from the enable circuit 34 is inputted to this control signal input terminal 38C.

Moreover, this output circuit 38 has a fifth resistor R75 that has one end connected to the emitter of the sixth transistor Tr76 and the other end grounded and a sixth resistor R76 that has one end connected to the power source and the other end connected to the output terminal 38D. Moreover, this output circuit 38 has an output transistor Tr7out that has a collector connected to the other end of the sixth resistor R76, a base connected to the emitter of the sixth transistor Tr76 and an emitter grounded.

The first through sixth transistors Tr71 through Tr76, the output transistor Tr7out and the control signal input transistor Tr78 are npn transistors.

The operation of this output circuit 38 will be described next. In this output circuit 38, the control signal input transistor Tr78 is connected parallel to the first transistor Tr71.

In this case, in order to put the output circuit 38 into the inoperative state, the second control signal inputted from the enable circuit 34 to the control signal input terminal 38C is made to have a voltage higher than the zero voltage. With this arrangement, even if the light beam spot is incident on the first photodiode PD1 and the first reference comparison signal Pout1 inputted to the input terminal 38A comes to have L-level, the emitter of the transistor Tr78 is consistently fixed to a voltage equal to the emitter voltage of the transistor Tr72 or a voltage higher than the emitter voltage of this transistor Tr72. The base voltage V76b of the transistor Tr76 is given by the following equation (2).

$$V76b = Vbe73 + Vbe75 + (V72 - V78) - \alpha \quad (2)$$

In the equation (2), Vbe73 represents the voltage across the base and the emitter of the transistor Tr73, and Vbe75 represents the voltage across the base and the emitter of the transistor Tr75. Moreover, V72 represents the voltage of the second reference comparison signal Pout2 applied to the second input terminal 38B, and V78 represents the voltage of the control signal applied to the control signal input terminal 38C.

By setting the resistance R71<R72 when the voltage V72 and the voltage V78 are equal to each other, $\alpha$ comes to have a positive value. Therefore, it is required to prevent the output transistor Tr7out from being turned on when V72 is equal to V78 by adjusting the value of $\alpha$ with the resistance values of the resistors R71 and R72.

On the other hand, when the output circuit 38 is put into the operative state, the transistor Tr78 becomes inoperative by inputting the signal Se of a voltage being not greater than the L-level of the first reference comparison signal Pout1 as the first control signal to the base of transistor Tr78, and the normal output circuit operation is achieved.

Figure 7:
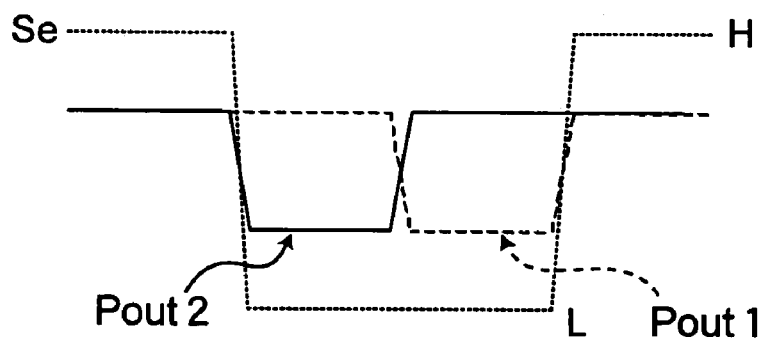
FIG. 7 is a waveform chart showing one example of the signal waveform of an enable signal Se and the signal waveforms of reference comparison signals Pout1 and Pout2.

As shown in FIG. 7, it is acceptable to set the H-level (second control signal) of the control signal (enable signal) higher than the H-level of the first and second reference comparison signals Pout1 and Pout2 and set the L-level (first control signal) of the control signal (enable signal) lower than the L-level of the first and second reference comparison signals Pout1 and Pout2. In this case, the enable control can be achieved without adjusting the resistances R71 and R72 of the output circuit. That is, when the enable input voltage (voltage of the second control signal) is set higher than the H-level of the voltage V72 of the second reference comparison signal Pout2 in the enabling stage in which the output circuit 38 is put into the inoperative state, then the voltage of the base voltage V76b of the transistor Tr76 becomes equal to or lower than 2×Vbe in the aforementioned equation (2), and the output transistor Tr7out can be turned off. Accordingly, there is no need to adjust $\alpha$ to a positive value.

When the enable input voltage (voltage of the first control signal) is set lower than the L-level of the voltage V71 of the first reference comparison signal Pout1 in the enable canceling stage in which the output circuit 38 is put into the operative state, then the control signal input transistor Tr78 is turned off regardless of the output state of the reference comparator 33. Therefore, the output state of the reference comparator 33 does not influence the response characteristic of the output of the light beam detection signal of the output circuit 38. Conversely speaking, unless the control signal input transistor Tr78 is completely turned off in the enable canceling stage, the switching time of the first transistor Tr71 is disadvantageously influenced, and a stable response characteristic cannot be obtained.

Figure 8:
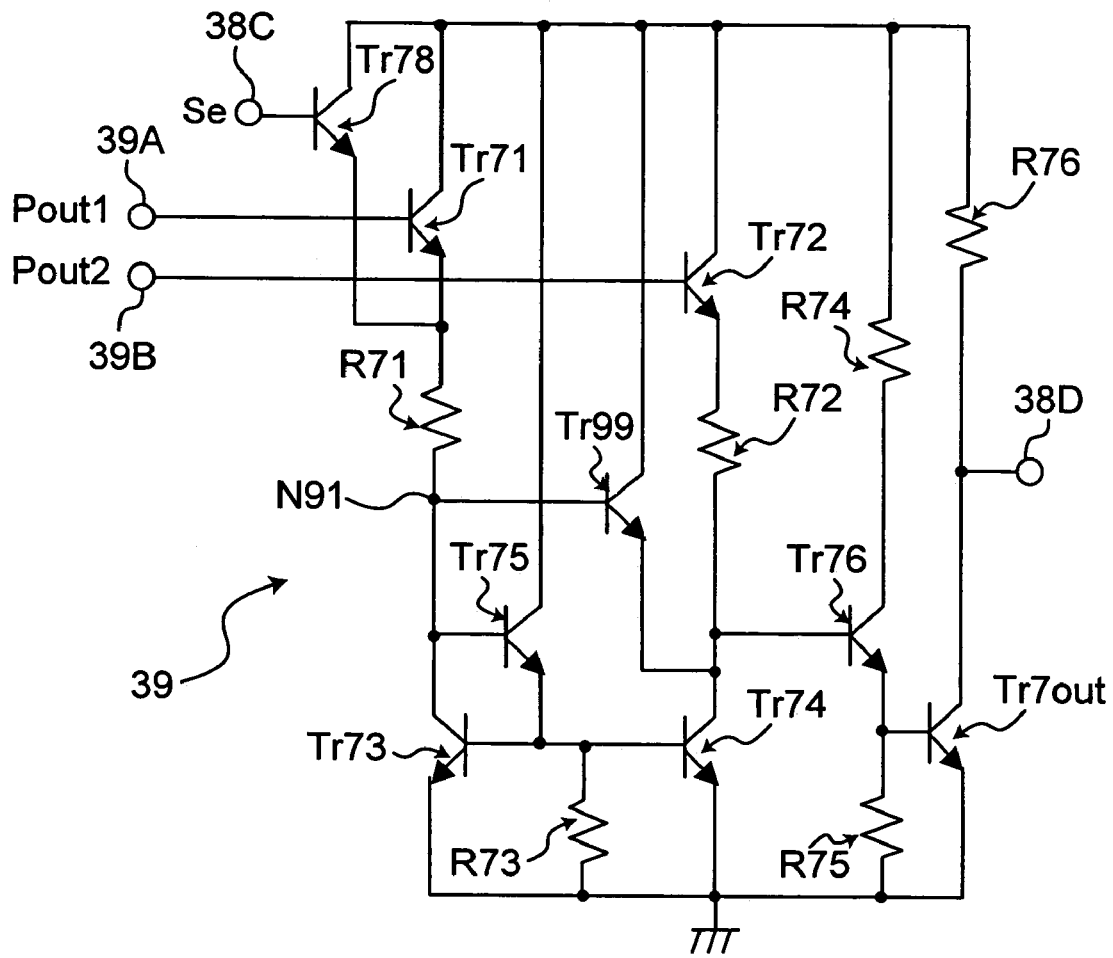
FIG. 8 is a circuit diagram showing a modification example of the output circuit 38 of FIG. 6.
Figure 9:
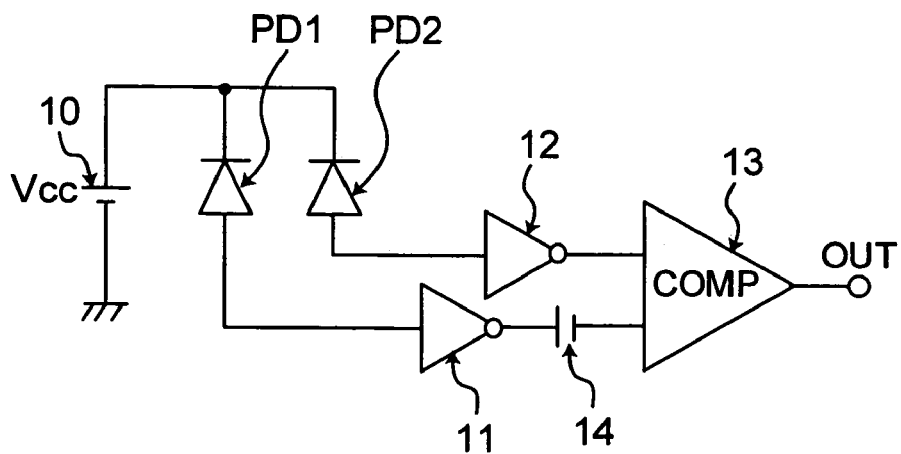
FIG. 9 is a diagram showing a prior art light beam synchronization detector.
Figure 10A:
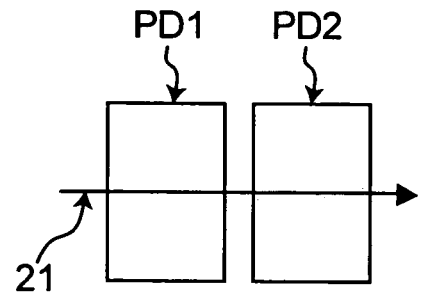
FIG. 10A is a view showing the layout of photodiodes in the above prior art example.
Figure 10B:
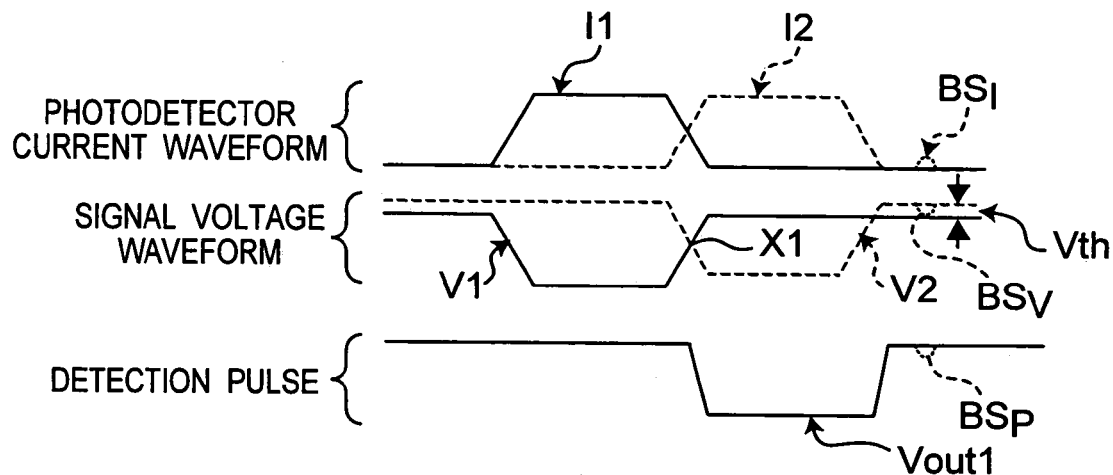
FIG. 10B is a waveform chart showing a photodetector current waveform, a signal voltage waveform, an enable signal waveform and a detection pulse waveform in the above prior art example.
Figure 10C:
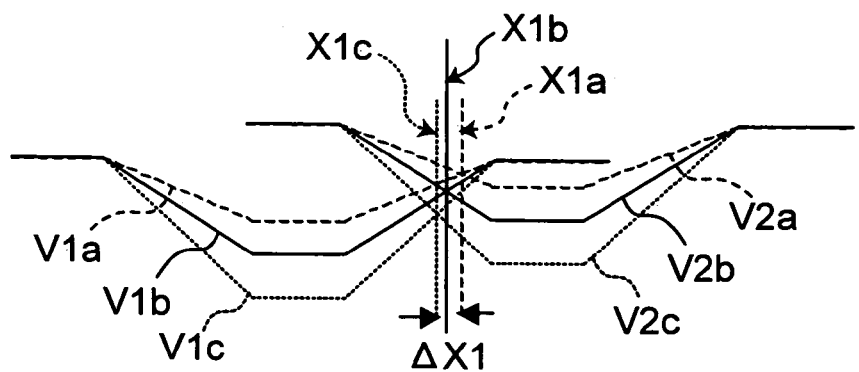
FIG. 10C is a waveform chart showing changes in the signal voltage waveform when the quantity of light of the light beam is changed.

Next, another example of the circuit of the output circuit 39 as a modification example of the output circuit 38 is shown in FIG. 8. This output circuit 39 differs from the aforementioned output circuit 38 only in that an npn transistor Tr99 that constitutes a clamp section for preventing the collector voltage of the fourth transistor Tr74 from being saturated by clamping the collector voltage in the output circuit 38. The npn transistor Tr99 has a base connected to a junction point N91 of the first resistor R71 and the base of the fifth transistor Tr75, a collector connected to the power source and an emitter connected to the collector of the fourth transistor Tr74.

When the enable voltage due to the second control signal inputted to the control signal input terminal 38C in the enabling stage in which the output circuit 38 is put into the inoperative state is excessively higher than a prescribed value in comparison with the voltage of the second reference comparison signal Pout2 in the aforementioned output circuit 38, it is sometimes a case where the absolute value of (V72−V78) is increased as expressed by the aforementioned equation (2) and the base voltage V76b of the sixth transistor Tr76 becomes excessively low. At this time, it is sometimes a case where the transistor Tr74 is disadvantageously saturated since the collector voltage of the transistor Tr74 is lowered, and this possibly leads to a deteriorated response characteristic.

In contrast to this, in this output circuit 39, when the collector voltage of the transistor Tr74 tries to become equal to or lower than the voltage Vbe across the base and the emitter, then the transistor Tr99 operates to supply a current to the transistor Tr74, by which the collector voltage of the transistor Tr74 can be prevented from becoming equal to or lower than the voltage Vbe. This makes it possible to achieve an enable control of output circuit capable of obtaining a stable response characteristic.

According to printers and printing devices such as laser beam printers provided with the light beam synchronization detectors of the aforementioned embodiments, there can be provided printers and printing devices, which have no erroneous detection due to reflected light and in which the detection timing does not depend on the quantity of light of the beam.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A light beam synchronization detector comprising:
   a first photoelectric converter section and a second photoelectric converter section;
   a comparison output section which receives inputs of a first output signal outputted from the first photoelectric converter section and a second output signal outputted from the second photoelectric converter section, compares the first output signal with the second output signal and generates and outputs a light beam detection signal on the basis of a result of the comparison; and
   a control section which receives inputs of the first output signal outputted from the first photoelectric converter section and the second output signal outputted from the second photoelectric converter section, outputs a first control signal to the comparison output section when at least one of the first output signal and the second output signal exceeds a prescribed threshold value to put the comparison output section into an operative state and outputs a second control signal to the comparison output section when both the first output signal and the second output signal are equal to or lower than the threshold value to put the comparison output section into an inoperative state, wherein
   the first photoelectric converter section comprises:
      a first photoelectric converter and a first signal converter section that converts a first current signal outputted from the first photoelectric converter into a first voltage signal and outputs the first voltage signal as the first output signal;
   the second photoelectric converter section comprises:
      a second photoelectric converter and a second signal converter section that converts a second current signal outputted from the second photoelectric converter into a second voltage signal and outputs the second voltage signal as the second output signal; and
   the threshold value is set to be smaller than an absolute value of both the first voltage signal and the second voltage signal when a quantity of light incident on either the first photoelectric converter section or the second photoelectric converter section is not greater than half of the quantity of light needed for normal operation of the light beam detector.

2. The light beam synchronization detector as claimed in claim 1, wherein
   the control section comprises:
      a hysteresis setting section for setting hysteresis for the threshold value.

3. The light beam synchronization detector as claimed in claim 1, wherein
   the control section comprises:
      a first comparator which receives inputs of the first output signal outputted from the first signal converter section and a threshold voltage as the prescribed threshold value, compares the first output signal with the threshold voltage and outputs a first comparison signal that represents a result of the comparison;
      a second comparator which receives inputs of the second output signal outputted from the second signal converter section and the threshold voltage, compares the second output signal with the threshold voltage and outputs a second comparison signal that represents a result of the comparison; and
      a control signal generating section which receives inputs of the first comparison signal and the second comparison signal, outputs the first control signal to the comparison output section when the first comparison signal indicates that the first output signal exceeds the threshold voltage or when the second comparison signal indicates that the second output signal exceeds the threshold voltage and outputs the second control signal to the comparison output section when the first comparison signal indicates that the first output signal is not higher than the threshold voltage and the second comparison signal indicates that the second output signal is not higher than the threshold voltage.

4. The light beam synchronization detector as claimed in claim 3, wherein
   the control signal generating section comprises:
      a logic operation circuit which receives inputs of the first comparison signal and the second comparison signal.

5. The light beam synchronization detector as claimed in claim 1, wherein
   the comparison output section comprises:
      a reference comparator which receives inputs of the first output signal and the second output signal, compares the first and second output signals with respective prescribed reference voltages and outputs first and second reference comparison signals that indicate results of the comparison; and
      an output circuit which receives inputs of the first and second reference comparison signals from the reference comparator, compares the first reference comparison signal with the second reference comparison signal and generates and outputs a light beam detection signal on the basis of a result of the comparison.

6. A printer comprising the light beam synchronization detector claimed in claim 1.

7. A light beam synchronization detector comprising:
   a first photoelectric converter section and a second photoelectric converter section;
   a comparison output section which receives inputs of a first output signal outputted from the first photoelectric converter section and a second output signal outputted from the second photoelectric converter section, compares the first output signal with the second output signal and generates and outputs a light beam detection signal on the basis of a result of the comparison; and a control section which receives inputs of the first output signal outputted from the first photoelectric converter section and the second output signal outputted from the second photoelectric converter section, outputs a first control signal to the comparison output section threshold value to put the comparison output section into an operative state and outputs a second control signal to the comparison output section when both the first output signal and the second output signal are equal to or lower than the threshold value to put the comparison output section into an inoperative state, wherein the first photoelectric converter section comprises:
   a first photoelectric converter and a first signal converter section that converts a first current signal outputted from the first photoelectric converter into a first voltage signal and outputs the first voltage signal as the first output signal;

the second photoelectric converter section comprises:
   a second photoelectric converter and a second signal converter section that converts a second current signal outputted from the second photoelectric converter into a second voltage signal and outputs the second voltage signal as the second output signal;

the control section comprises:
   a first comparator which receives inputs of the first output signal outputted from the first signal converter section and a threshold voltage as the prescribed threshold value, compares the first output signal with the threshold voltage and outputs a first comparison signal that represents a result of the comparison;
   a second comparator which receives inputs of the second output signal outputted from the second signal converter section and the threshold voltage, compares the second output signal with the threshold voltage and outputs a second comparison signal that represents a result of the comparison; and
   a control signal generating section which receives inputs of the first comparison signal and the second comparison signal outputs the first control signal to the comparison output section when the first comparison signal indicates that the first output signal exceeds the threshold voltage or when the second comparison signal indicates that the second output signal exceeds the threshold voltage and outputs the second control signal to the comparison output section when the first comparison signal indicates that the first output signal is not higher than the threshold voltage and the second comparison signal indicates that the second output signal is not higher than the threshold voltage; and the control signal generating section comprises:
   a signal adding section which receives inputs of the first comparison signal and the second comparison signal and outputs an addition signal obtained by adding the first comparison signal to the second comparison signal; and
   a clamp section which clamps the addition signal outputted from the signal adding section.

8. A light beam synchronization detector comprising:
a first photoelectric converter section and a second photoelectric converter section;
a comparison output section which receives inputs of a first output signal outputted from the first photoelectric converter section and a second output signal outputted from the second photoelectric converter section, compares the first output signal with the second output signal and generates and outputs a light beam detection signal on the basis of a result of the comparison; and a control section which receives inputs of the first output signal outputted from the first photoelectric converter section and the second output signal outputted from the second photoelectric converter section, outputs a first control signal to the comparison output section when at least one of the first output signal and the second output signal exceeds a prescribed threshold value to put the comparison output section into an operative state and outputs a second control signal to the comparison output section when both the first output signal and the second output signal are equal to or lower than the threshold value to put the comparison output section into an inoperative state, wherein the comparison output section comprises:
   a reference comparator which receives inputs of the first output signal and the second output signal, compares the first and second output signals with respective prescribed reference voltages and outputs first and second reference comparison signals that indicate results of the comparison; and
   an output circuit which receives inputs of the first and second reference comparison signals from the reference comparator, compares the first reference comparison signal with the second reference comparison signal and generates and outputs a light beam detection signal on the basis of a result of the comparison; and the output circuit comprises:
   a first input terminal which receives an input of the first reference comparison signal;
   a second input terminal which receives an input of the second reference comparison signal;
   a control signal input terminal which receives inputs of the first and second control signals from the control section;
   an output terminal which outputs the light beam detection signal;
   a first transistor having a base connected to the first input terminal and a collector connected to a power source;
   a second transistor having a base connected to the second input terminal and a collector connected to the power source;
   a first resistor having one end connected to an emitter of the first transistor;
   a second resistor having one end connected to an emitter of the second transistor;
   a third transistor having a collector connected to the other end of the first resistor and an emitter grounded;
   a fourth transistor having a collector connected to the other end of the second resistor, a base connected to a base of the third transistor and an emitter grounded;
   a fifth transistor having a collector connected to the power source, a base connected to the other end of the first resistor and an emitter connected to the base of the third transistor;
   a third resistor having one end connected to the base of the third transistor and the other end grounded;
   a fourth resistor having one end connected to the power source;
   a sixth transistor having a collector connected to the other end of the fourth resistor and a base connected to the other end of the second resistor;

a control signal input transistor having an emitter connected to a base of the sixth transistor, a base connected to the control signal input terminal and a collector grounded;

a fifth resistor having one end connected to an emitter of the sixth transistor and the other end grounded;

a sixth resistor having one end connected to the power source and the other end connected to the output terminal; and an output transistor having a collector connected to the output terminal, a base connected to the emitter of the sixth transistor and an emitter grounded, the first through sixth transistors and the output transistor being npn transistors, and the control signal input transistor being a pnp transistor.

9. A light beam synchronization detector comprising:

a first photoelectric converter section and a second photoelectric converter section;

a comparison output section which receives inputs of a first output signal outputted from the first photoelectric converter section and a second output signal outputted from the second photoelectric converter section, compares the first output signal with the second output signal and generates and outputs a light beam detection signal on the basis of a result of the comparison; and a control section which receives inputs of the first output signal outputted from the first photoelectric converter section and the second output signal outputted from the second photoelectric converter section, outputs a first control signal to the comparison output section when at least one of the first output signal and the second output signal exceeds a prescribed threshold value to put the comparison output section into an operative state and outputs a second control signal to the comparison output section when both the first output signal and the second output signal are equal to or lower than the threshold value to put the comparison output section into an inoperative state, wherein the comparison output section comprises:

a reference comparator which receives inputs of the first output signal and the second output signal, compares the first and second output signals with respective prescribed reference voltages and outputs first and second reference comparison signals that indicate results of the comparison; and an output circuit which receives inputs of the first and second reference comparison signals from the reference comparator, compares the first reference comparison signal with the second reference comparison signal and generates and outputs a light beam detection signal on the basis of a result of the comparison; and the output circuit comprises:

a first transistor having a base connected to the first input terminal and a collector connected to a power source;

a second transistor having a base connected to the second input terminal and a collector connected to the power source;

a first resistor having one end connected to an emitter of the first transistor;

a second resistor having one end connected to an emitter of the second transistor;

a third transistor having a collector connected to the other end of the first resistor and an emitter grounded;

a fourth transistor having a collector connected to the other end of the second resistor, a base connected to a base of the third transistor and an emitter grounded;

a fifth transistor having a collector connected to the power source, a base connected to the other end of the first resistor and an emitter connected to the base of the third transistor;

a third resistor having one end connected to the base of the third transistor and the other end grounded;

a fourth resistor having one end connected to the power source;

a sixth transistor having a collector connected to the other end of the fourth resistor and a base connected to the other end of the second resistor;

a control signal input transistor having a collector connected to the power source, a base connected to the control signal input terminal and an emitter connected to an emitter of the first transistor;

a fifth resistor having one end connected to an emitter of the sixth transistor and the other end grounded;

a sixth resistor having one end connected to the power source and the other end connected to the output terminal; and an output transistor having a collector connected to the other end of the sixth resistor, a base connected to the emitter of the sixth transistor and an emitter grounded, the first through sixth transistors, the output transistor and the control signal input transistor being npn transistors.

10. The light beam synchronization detector as claimed in claim 9, wherein an upper limit value of the first and second control signals outputted from the control section is higher than an upper limit value of the first and second reference comparison signals outputted from the reference comparator, and a lower limit value of the first and second control signals outputted from the control section is lower than a lower limit value of the first and second reference comparison signals outputted from the reference comparator.

11. The light beam sychronization detector as claimed in claim 10, further comprising:

a clamp section which clamps a collector voltage of the fourth transistor so that the collector voltage is prevented from being saturated.

* * * * *